No. 804,027. PATENTED NOV. 7, 1905.
C. NEUMANN.
AIR COMPRESSOR.
APPLICATION FILED DEC. 8, 1904.
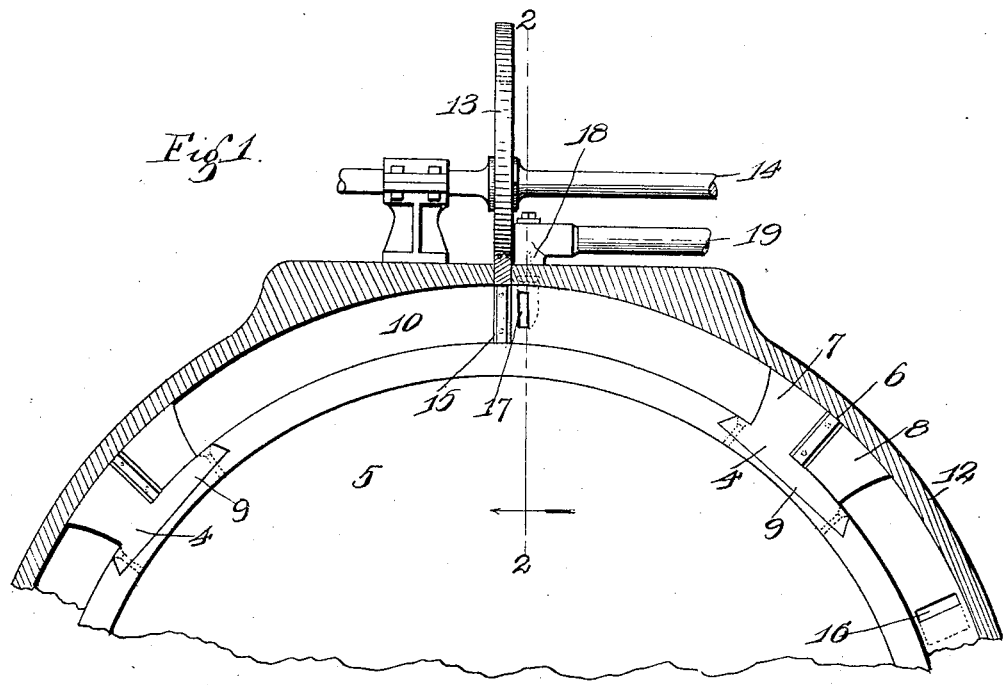
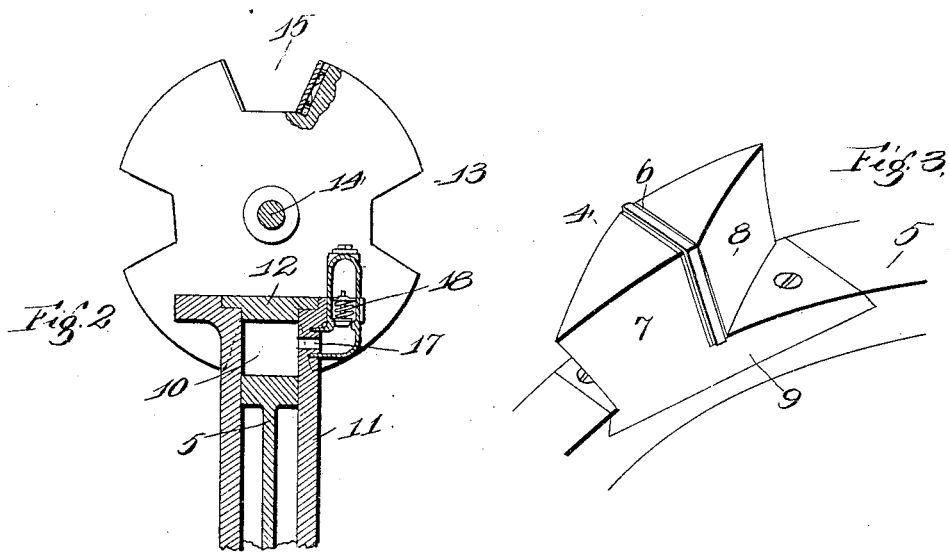
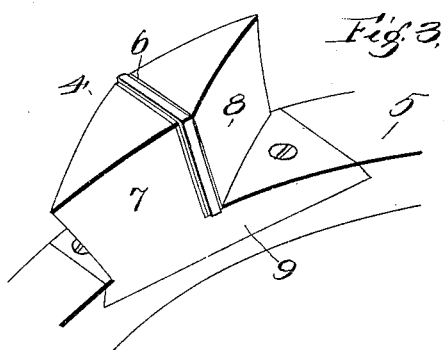
Witnesses
M. J. Eicks
Fred. Michels
Inventor
Christian Neumann
by Alfred A. Eicks atty.

UNITED STATES PATENT OFFICE.

CHRISTIAN NEUMANN, OF ST. LOUIS, MISSOURI, ASSIGNOR TO NATURAL POWER COMPANY, OF ST. LOUIS, MISSOURI, A CORPORATION.

AIR-COMPRESSOR.

No. 804,027.   Specification of Letters Patent.   Patented Nov. 7, 1905.

Application filed December 8, 1904. Serial No. 236,050.

*To all whom it may concern:*

Be it known that I, CHRISTIAN NEUMANN, a citizen of the United States, residing at St. Louis, in the State of Missouri, have invented certain new and useful Improvements in Air-Compressors, of which the following is a specification, reference being had therein to the accompanying drawings.

This invention relates to improvements in air-compressors of the rotary type; and it consists in the novel arrangement, construction, and combination of parts, as will be fully hereinafter described and claimed.

The invention as shown and hereinafter described is an improvement over an application for patent filed by me on November 2, 1903, Serial No. 179,467, "Rotary air-compressors."

The object of my invention is to combine a rotary air-compressor, pistons, and a revolving cut-off disk located upon the casing and passing through the piston-chamber and having a plurality of passages of sufficient size to permit the pistons to pass through. The pistons are tapered in form, and thereby more easily enter the passages, yet prevent the compressed air in the chamber from escaping through the said passages, but expel said compressed air through the discharge-opening and into a receiving-reservoir.

A still further object is the packing of the pistons and the walls of the passages for perfect contact and connection.

In the drawings, Figure 1 is a vertical longitudinal sectional view of my improved device with a part thereof broken away. Fig. 2 is a vertical cross-sectional view of the same, taken on the line 2 2 of Fig. 1, viewing the same in a direction as indicated by the arrow. Fig. 3 is a detail perspective view of one of the pistons, showing an angular or tapered form and its position upon the revolving disk.

Before describing my improvement in detail I wish to remark that I did not show the entire compressor, but those parts only I desire to claim, as the remaining features have already been presented in a previous application, as noted before.

The improvement consists of pistons 4, located at intervals upon the periphery of the revolving disk 5, which is supported and revolubly mounted upon a shaft. The piston 4 consists of a rectangular center 6, having forward and rearward tapered or wedge-shaped projections 7 and 8, all being formed integral with a base 9, with two of its ends dovetailed to fit within the dovetailed recess formed in the periphery of the disk. The piston operates in the chamber 10, formed between the periphery of the disk 5, the casing-walls 11, and cover 12. Crosswise through this chamber operates a cut-off disk 13, which is mounted upon a shaft 14, supported in suitable bearings, and the said disk is provided with openings 15, arranged of sufficient size to permit the passage of the pistons. The said openings and pistons are provided with suitable packing-strips to provide a perfect contact and leak-proof joint. The air is admitted into the chamber through the opening 16, compressed in the chamber, and expelled through the opening 17, through a check-valve 18, and into a pipe 19, leading to a reservoir. As the pistons travel and the cut-off disk rotates, air is compressed and expelled automatically, the solid portion of the cut-off disk acting as the abutment, the pistons as the compressors. By this arrangement all the air compressed is discharged through the opening 17.

Having fully described my invention, what I claim is—

1. An air-compressor, comprising a casing forming a compression-chamber a revolving disk therein, pistons having forward and rearward tapered ends located upon the said disk: a rotary cut-off disk traveling through the compressing-chamber and having openings for the passage of the piston whereof to compress air between the pistons and disk, substantially as specified.

2. An air-compressor, having a casing forming a compression-chamber pistons mounted upon a revolving disk traveling in the chamber, a passage formed between the disk and casing; a rotary cut-off disk having openings for the passage of the piston and operating through the chamber; the front and rear surface of the pistons being tapered to pass through the openings in the cut-off disk, and openings formed in the casing for admitting and expelling the air, substantially as specified.

3. An air-compressor, comprising a casing elongated wedge-shaped pistons upon a revolving disk, an automatic rotary cut-off disk passing in its rotation through the said casing; said pistons traveling through a chamber between the disk and the casing, the said pistons arranged to pass through recesses, and passages formed in the cut-off disk and means for controlling the discharge of air compressed in the chamber, substantially as specified.

In testimony whereof I affix my signature in presence of two witnesses.

CHRISTIAN NEUMANN.

Witnesses:
ALFRED A. EICKS,
FRED. MICHELS.